United States Patent
de La Chapelle et al.

(10) Patent No.: US 8,359,026 B2
(45) Date of Patent: Jan. 22, 2013

(54) RF SIGNAL FEED THROUGH METHOD AND APPARATUS FOR SHIELDED AIRCRAFT FUSELAGE

(75) Inventors: Michael de La Chapelle, Bellevue, WA (US); Dave W Bogart, Renton, WA (US)

(73) Assignee: The Boeing Company, Chicago, IL (US)

( * ) Notice: Subject to any disclaimer, the term of this patent is extended or adjusted under 35 U.S.C. 154(b) by 1368 days.

(21) Appl. No.: 11/440,301

(22) Filed: May 24, 2006

(65) Prior Publication Data

US 2006/0270354 A1    Nov. 30, 2006

Related U.S. Application Data

(60) Provisional application No. 60/684,205, filed on May 24, 2005.

(51) Int. Cl.
 *H04W 4/00* (2009.01)
(52) U.S. Cl. .................. 455/431; 455/422.1; 455/426.1
(58) Field of Classification Search .................. 455/431, 455/422.1, 426.1
 See application file for complete search history.

(56) References Cited

U.S. PATENT DOCUMENTS

| | | | |
|---|---|---|---|
| 5,670,742 A | 9/1997 | Jones | |
| 5,995,833 A * | 11/1999 | Zicker | 455/430 |
| 6,393,281 B1 * | 5/2002 | Capone et al. | 455/428 |
| 6,477,152 B1 * | 11/2002 | Hiett | 370/316 |
| 6,968,187 B1 * | 11/2005 | Irwin et al. | 455/431 |
| 7,120,435 B2 * | 10/2006 | Usher et al. | 455/431 |
| 7,146,147 B1 * | 12/2006 | Sabatino | 455/300 |
| 2002/0016168 A1 * | 2/2002 | Rousseau et al. | 455/427 |
| 2002/0102968 A1 | 8/2002 | Arend et al. | |
| 2002/0160773 A1 | 10/2002 | Gresham et al. | |
| 2004/0142658 A1 * | 7/2004 | McKenna et al. | 455/11.1 |
| 2006/0246892 A1 * | 11/2006 | vonDoenhoff et al. | 455/427 |

FOREIGN PATENT DOCUMENTS

| | | |
|---|---|---|
| EP | 0915577 | 10/1998 |
| EP | 1 061 686 | 2/1999 |
| EP | 1146666 | 4/2000 |
| EP | 1 096 699 | 5/2001 |
| EP | 1 478 106 | 4/2004 |
| FR | 2793106 | 11/2000 |
| WO | WO 98/56192 | 12/1998 |

OTHER PUBLICATIONS

Partial European Search Report, Jul. 9, 2004. PCT International Search Report, PCT Application US2006/020024, Sep. 27, 2006.
Article, "Pico cell technology improves cellular investment," Puneet Gupta, TechRepublic, Aug. 16, 2002, p. 1.
"AgHT Film Product Line," CPFilms Inc., Martinsville, VA, 2001, p. 1.

* cited by examiner

*Primary Examiner* — Olumide T Ajibade Akonai
*Assistant Examiner* — Jaime Holliday
(74) *Attorney, Agent, or Firm* — Harness, Dickey & Pierce, P.L.C.

(57) ABSTRACT

A system and method for selectively enabling and disabling wireless connectivity between cellular or PDA users on-board commercial aircraft having a shielded fuselage, and remotely located wireless access points, while the aircraft is at an airport or airfield. The system and method does not require access to an on-board LAN system of the aircraft. The system includes one or more antennae disposed in the cabin area of the aircraft that are coupled via an RF switch with an exterior antenna mounted on an exterior of the fuselage. The RF switch is controlled by a switch control subsystem, and enables or disables communication between the interior antennae and the exterior antenna. The exterior antenna is connected to the switch via a conductor that extends through the shielding of the aircraft. When the RF switch is in the closed position, cellular or PDA users can connect through the interior antennae and the exterior antenna directly to remotely located wireless access points.

23 Claims, 2 Drawing Sheets

RF SIGNAL FEED THROUGH METHOD AND APPARATUS FOR SHIELDED AIRCRAFT FUSELAGE

CROSS-REFERENCE TO RELATED APPLICATIONS

This application claims the benefit of U.S. Provisional Application No. 60/684,205, filed on May 24, 2005. The disclosure of the above application is incorporated herein by reference. The subject matter of the present application is related to U.S. application Ser. No. 10/435,785, filed May 12, 2003, entitled "Wireless Communication Inside Shielded Envelope", which is also incorporated by reference herein.

FIELD

The present invention relates to systems and methods for transmitting RF signals from a mobile platform, and more particularly to a system and method for transmitting RF signals to and from cellular devices of individuals traveling on a mobile platform to a remotely located wireless access point, where the body of the mobile platform is shielded and would otherwise block the passage of RF signals into or out from the interior area of the mobile platform.

BACKGROUND

Mobile platform passengers, for example, commercial aircraft passengers, generally desire to be able to use their wireless devices (e.g., cell phones, PDAs) to communicate with external wireless networks while the aircraft is parked at a gate and/or during taxiing. The subject matter of co-pending U.S. application Ser. No. 10/435,785 (filed May 12, 2003) allows individuals to connect their wireless devices to on-board pico cells or wireless access points within the aircraft while the aircraft is on the ground, however, the passengers would be required to use the existing on-board communications network within the aircraft to achieve wireless connectivity with remotely located wireless access points. Such an existing network often involves a series of wireless access points located within the aircraft that are in communication with a local area network (LAN), with the LAN being in communication with a server/router. A mechanically scanned reflector antenna or a phased array antenna is mounted on an exterior surface of the fuselage.

In many instances, it would be more preferable to enable the passengers to wirelessly connect directly with remote wireless access points without the need to connect through the on-board network and antenna system of the aircraft.

When the fuselage of the aircraft is shielded, the fuselage, presents a problem for wireless connectivity of user wireless devices attempting to access a remotely located (e.g., terrestrial) wireless access point. The shielding of the fuselage generally makes this impossible and users on board the aircraft would generally be required to connect to the wireless access points through the on-board network on the aircraft.

Thus, it would be highly desirable to provide some means that would enable users with wireless devices on board the aircraft to wirelessly access the wireless access point located remotely from the aircraft without the need to connect through the on-board network of the aircraft when the fuselage of the aircraft is shielded.

SUMMARY

The present invention is directed to a system and method for enabling users of wireless devices traveling on a shielded mobile platform, for example an aircraft having a shielded fuselage, to wirelessly connect with remotely located access points without the need to make the wireless connection through an existing on-board network of the aircraft. In one preferred form the system includes a first antenna that is mounted within the mobile platform. A second antenna is mounted on an exterior surface of the mobile platform. Conductive cabling connects the two antennae to a control system that completes or interrupts the circuit path between the two antennae. When the circuit path between the two antennae is completed, the user with the wireless device inside the mobile platform can wirelessly connect with the second antenna by first connecting with the first antenna. The second antenna then makes a wireless connection with the remotely located wireless access point. Thus, two-way communications with the wireless access point are enabled and the shielding of the mobile platform does not form any impediment to the cellular RF signals being transmitted to and from the interior area of the mobile platform.

In one preferred form the control system forms an RF switch. The RF switch may be manually controlled or controlled by other components on board the mobile platform so that wireless connectivity is provided to occupants of the mobile platform only at predetermined times (e.g., while parked at a gate, taxiing, etc.). In this embodiment, the conductors enable communication between the two antennae so that the on-board network of the aircraft is not needed to establish wireless connectivity with the remotely located wireless access point (s).

In another preferred embodiment, one or more amplifiers may be included to boost the signal being received by the second antenna or being transmitted from the second antenna. Alternatively, one or more filters may be employed in the signal path between the first and second antennae to filter RF signals outside of the desired RF signal spectrum.

In still another preferred form of the present invention, a plurality of first antennae may be employed within the mobile platform at spaced apart locations to ensure better wireless connectivity with the wireless devices of the occupants.

The various preferred embodiments and methods described in the present application thus enable wireless connectivity for users of wireless devices traveling within a mobile platform having a shielded structure, without the need to access the on-board communications network of the aircraft.

The features, functions, and advantages can be achieved independently in various embodiments of the present inventions or may be combined in yet other embodiments.

BRIEF DESCRIPTION OF THE DRAWINGS

The present disclosure will become more fully understood from the detailed description and the accompanying drawings, wherein.

DETAILED DESCRIPTION

The following description of the various embodiment(s) is merely exemplary in nature and is in no way intended to limit the disclosure, its application, or uses.

Figure 1:
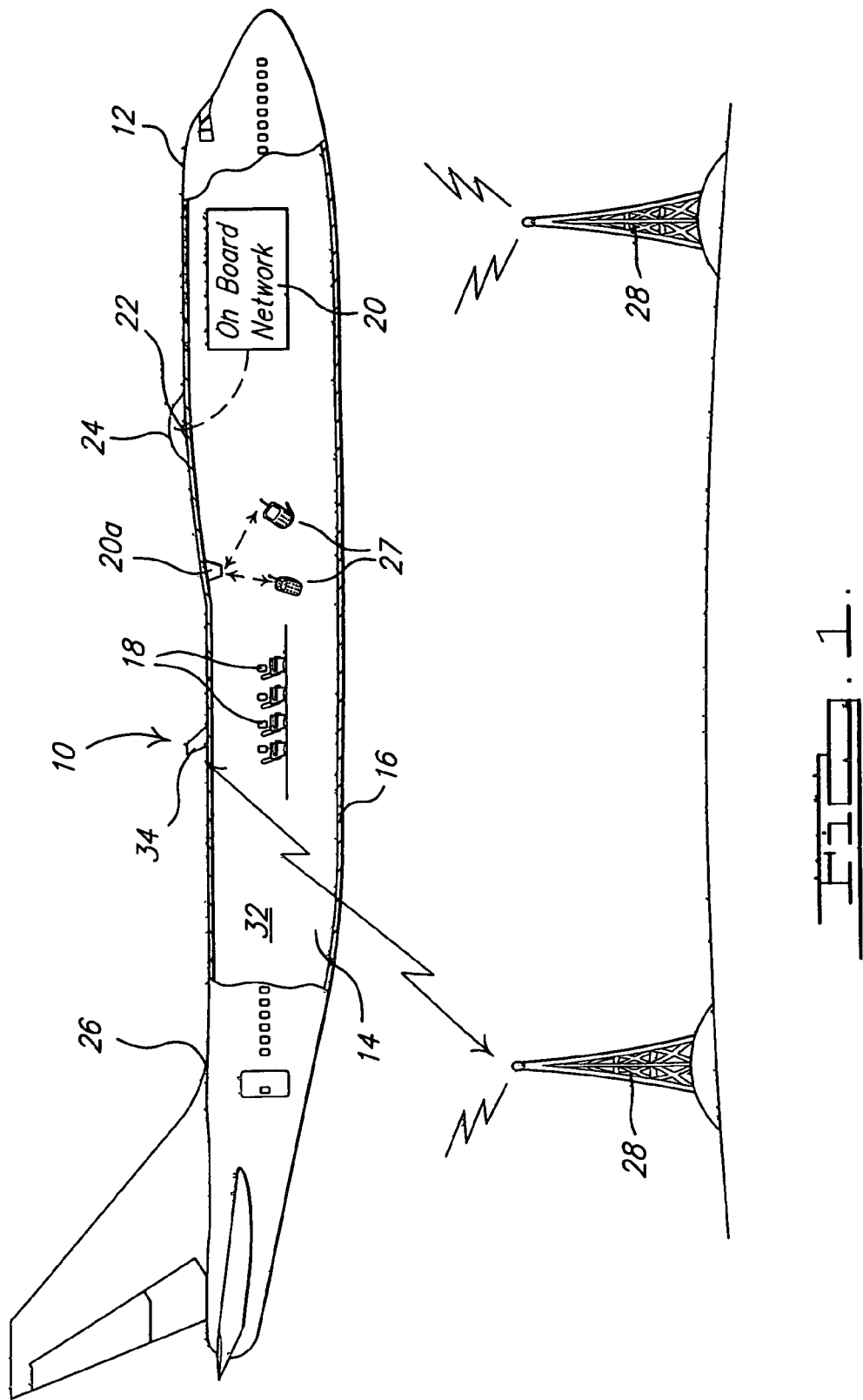
FIG. 1 is a simplified diagrammatic view of a mobile platform, in this example an aircraft, incorporating an embodiment of the present system that enables wireless connectivity through a shielded fuselage of the aircraft, with a plurality of wireless access points located remotely from the aircraft.

Referring to FIG. 1, a system 10 in accordance with an embodiment of the present system is shown implemented on a commercial aircraft 12. It will be appreciated that a fuselage 14 of the aircraft is shielded, as indicated in highly simplified form by reference numeral 16. The windows 18 of the aircraft 12 are also shielded, such as in accordance with U.S. application Ser. No. 10/435,785 (filed May 12, 2003). Aircraft 12, in this example, also includes an on-board network 20 that is in communication with a dedicated antenna 22 housed under a radome 24 on an external surface 26 of the aircraft 12. The on-board network 20 and the antenna 22 enable a satellite communications link to be established with one or more transponded satellites to enable two-way communications with laptops and personal electronic devices (PDAS) of users traveling on the aircraft 12 and terrestrial-based information content stations. Further details of such a system are disclosed in co-pending U.S. application Ser. No. 09/639,912, filed Aug. 16, 2000 and assigned to the Boeing Company, the entire disclosure of which is also incorporated by reference herein.

With the exemplary mobile platform 12 illustrated in FIG. 1, the shielding 16 of the fuselage 14 prevents cellular devices or PDAs 27 from wirelessly connecting through the fuselage 14 or the windows 18 of the aircraft 12 with one or more terrestrial wireless access points 28, unless the wireless connection is established through the on-board network 20 and a wireless access point 20a in communication with the network 20. The system and method of the present invention overcomes this limitation by providing an alternate, more direct means of connecting with the wireless access points 28.

Figure 2:
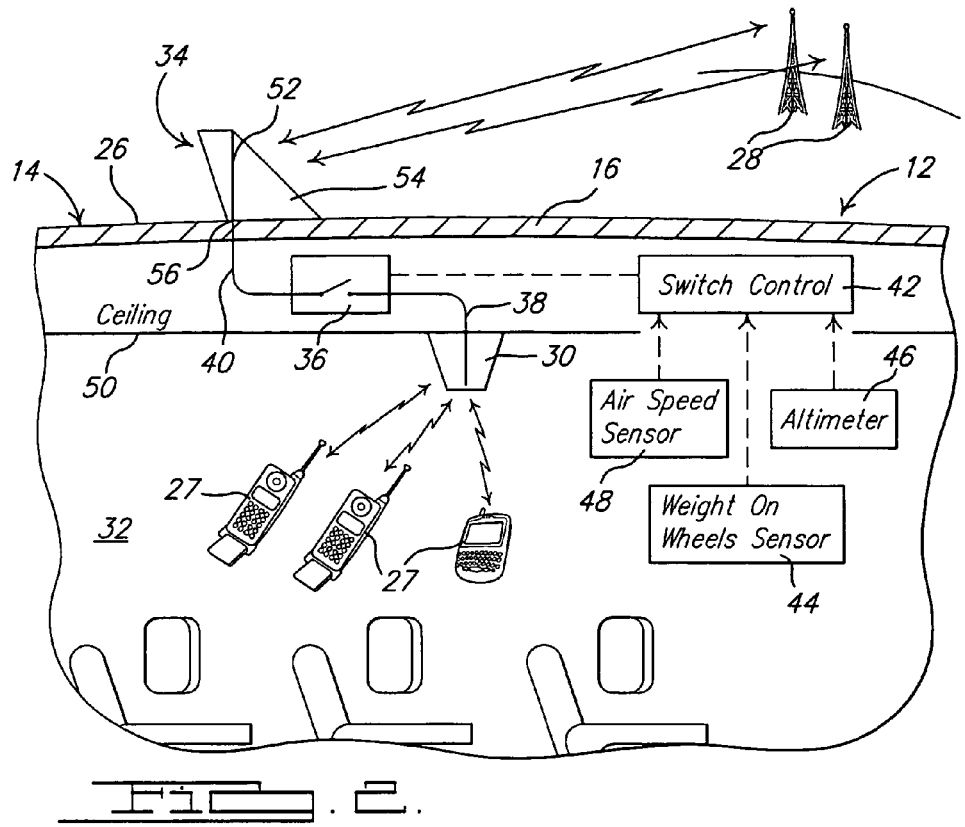
FIG. 2 is an enlarged diagrammatic view of a portion of the mobile platform illustrating the two antennae and the switch control system that enables or disables communication between the two antennae employed to facilitate wireless connectivity with the remote wireless access points.

Referring to FIG. 2, the system 10 generally includes a first antenna 30 disposed in an interior area 32 of the aircraft 12, and a second antenna 34 disposed on the exterior surface 26 of the aircraft 12. The antennae 30, 34 are electrically coupled and uncoupled from one another to enable wireless signals from the cellular or PDA devices 26 to be transmitted to and from the wireless access points 28.

Further, with reference to FIG. 2, the system 10 further includes an RF switch 36 that is disposed in between a first conductor 38 and a second conductor 40. Conductor 38 couples the first (i.e., interior) antenna 30 with RF switch 36, and the second conductor 40 couples the second (i.e., exterior) antenna 34 with the opposite side of the RF switch 36. The RF switch 36 is thus disposed in series between the two antennae 30, 34. In one preferred form the RF switch comprises a conventional double pole, double throw switch (DPDT). The RF switch 36 is widely commercially available from a number of companies.

With further reference to FIG. 2, the RF switch 36 is remotely controlled via RF signals from a switch control subsystem 42 located within the interior area 32 of the aircraft 12. The switch control subsystem 42 may take a number of alternative forms. For example, the switch control subsystem 42 could represent a manual switch that is engaged by one or more crew members of the aircraft 12 to close or open the contacts of the RF switch 36 at predetermined times during operation of the aircraft 12, such as when the aircraft lands, during taxiing or while parked at a gate. The switch control subsystem 42, alternatively, could be responsive to a weight-on-wheels sensor 44 that sends a signal to the switch control subsystem 42 when the weight on the wheels of the aircraft exceeds a predetermined weight, thus indicating that the aircraft has landed and a wireless connection with remote access points 28 is now permitted. Alternatively, the switch control subsystem 42 could be responsive to an altimeter 46 to only enable wireless RF connectivity with the remote access points 28 through the system 10 when the aircraft 12 is at ground level. Still further, the switch control 42 could be responsive to an air speed sensor 48 that signals the switch control 42 when to open and close the RF switch 36 in accordance with the sensed air speed of the aircraft 12. Other forms of sensors could also be interfaced to the switch control subsystem 42 to control the operation of the RF switch 36 in accordance with other criteria, parameters or operating conditions.

With further reference to FIG. 2, the interior antenna 30 may be located in a plurality of different points within the aircraft 12, but is preferably located in an overhead area of the aircraft adjacent a ceiling 50 of the cabin area 32 of the aircraft. The interior antenna 30 typically projects down from the ceiling 50 only a short distance, and therefore does not form a significant protrusion into the cabin area. The exterior antenna 34, in one preferred form, is formed by a monopole radiating/reception element 52 housed within an aerodynamic, blade-like housing 54. The conductor 40 extends through an opening 56 in the shielding 16 of the fuselage 14 to communicate with the monopole element 52. It will be appreciated that the opening 56 is suitably sealed when the second antenna 34 is secured to the fuselage 14. The antenna 34 is widely commercially available.

Figure 3:
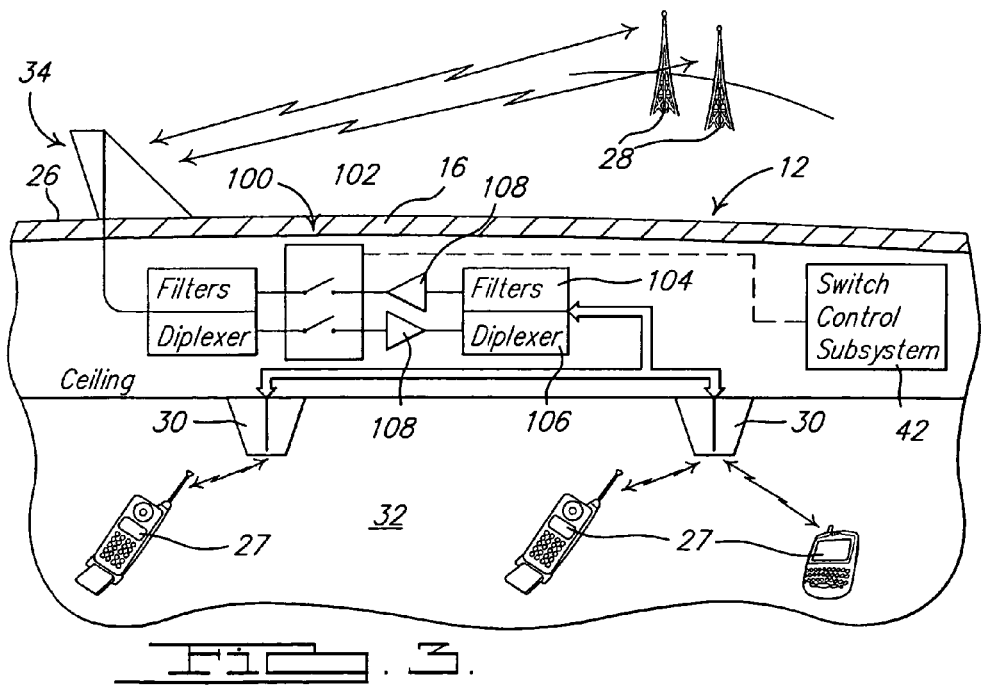
FIG. 3 is an alternative preferred form of the system illustrated in FIG. 2 in which one or more filters, diplexers and/or amplifiers are incorporated in the system.

Referring to FIG. 3, an alternative implementation 100 of the present system is shown. This embodiment makes use of a plurality of first antennae 30 located at spaced apart locations within the cabin area 32 of the aircraft 12, as well as the second antenna 34. However, a multi-throw RF switch component 102 is incorporated for coupling each of the first antennae 30 with the exterior antenna 34. Alternatively, one or more filters 104 and/or diplexers 106 could be incorporated to filter RF signals transmitted from the wireless access points 28 being received by the exterior antenna 34 so that only RF signals within a desired frequency spectrum are received by the antennae 30. One or more low noise amplifiers 108 could also be included as a signal booster for boosting the amplitude of RF signals received by the second antenna 34, or being transmitted from the second antenna 34. The amplifiers 108 are anticipated to be especially helpful in enabling wireless connections with wireless local area networks located outside an airport area. The filters 104 are helpful in performing selective filtering to maintain fuselage isolation in certain frequency bands, such as those frequency bands used by wireless local area networks (WiFi networks). This can reduce RF interference in the dense airport RF environment where many WiFi networks may be operating in close proximity to one another. Also, filtering by the filters 104 can protect the on-board wireless network 20 (FIG. 1) from outside intrusion (e.g., unauthorized activities such as hacking). Accordingly, the filtering provided by the filters 104 can enhance network security by maintaining on-board network 20 isolation even while the aircraft 12 is on the ground.

In yet another alternative form, a single leaky transmission line may be employed within the fuselage 14 of the aircraft 12 to assure uniform performance throughout the cabin (inventor to explain further, if possible). The RF switch assembly 36 or 102, filters 104, diplexers 106, may all be incorporated into a single chassis that may include the interior antenna 30 or possibly more than one such interior antenna 30.

The system and method of the present disclosure thus enables wireless connectivity between cellular devices or PDAs of users on board a mobile platform having a shielded cabin area, with remotely located wireless access points, without the need to make use of an on-board local area network subsystem of the mobile platform. This enables more direct and potentially lower cost access by cellular and/or PDA users while the mobile platform is operating in areas where wireless connectivity is permitted/possible with remotely located wireless access points. The system and method of the present disclosure can be readily implemented in existing mobile platforms, and particularly with present day commercial aircraft, with a limited number of independent components. The various embodiments can just as readily be implemented in other forms of mobile platforms, such as ships, trains, buses, rotorcraft, etc.

While various embodiments have been described, those skilled in the art will recognize modifications or variations which might be made without departing from the inventive concept. The examples illustrate the system and method and are not intended to limit it. Therefore, the description and claims should be interpreted liberally with only such limitation as is necessary in view of the pertinent prior art.

What is claimed is:

1. A system for enabling and disabling wireless communication between a user operated wireless device located inside of an mobile platform, and a wireless access point located remotely from said mobile platform, the system comprising:
   electromagnetic shielding included on a body of the mobile platform to inhibit the communication of wireless signals from a remote source through the body and into a passenger area of the mobile platform;
   a first antenna disposed within an interior area of said mobile platform for communicating exclusively with said user operated wireless device;
   a second antenna disposed on an exterior surface of said mobile platform, and used exclusively for establishing a wireless communications link between said user operated wireless device and said remotely located wireless access point;
   a switch coupled directly between said first antenna and said second antenna for selectively enabling and disabling communication between said first and second antennas;
   an on-board network operated independently of the user operated wireless device, independently of the first antenna and independently of the second antenna, and also being inaccessible by the user operated wireless device;
   a third antenna for use exclusively with the on-board network, and used for enabling communications concerning performance of a plurality of mobile platform sensors between the on-board network and at least one transponded satellite; and
   the switch being responsive to an external component associated with the mobile platform to interrupt a connection between the first and second antennas in response to a signal from the external component.

2. The system of claim 1, wherein the first antenna is supported at a predetermined location within said interior area of said mobile platform.

3. The system of claim 1, wherein the second antenna comprises a blade-like antenna on an exterior skin of said mobile platform.

4. The system of claim 1, further comprising an amplifier for amplifying signals being received by said second antenna and transmitted by said first antenna.

5. The system of claim 1, further comprising an amplifier for amplifying signals being received by said first antenna and transmitted by said second antenna.

6. The system of claim 5, further comprising diplexers for combining and separating said signals passing between said antennas.

7. The system of claim 1, further comprising a filter for filtering RF signals passing through said second antenna.

8. The system of claim 1, wherein a plurality of said first antennas are located at spaced apart locations within said mobile platform, with each of said antennas being in communication with said second antenna via said switch.

9. A mobile platform comprising:
   an electromagnetically shielded body;
   a system for enabling wireless communication between a user operated wireless device located inside of the electromagnetically shielded body of the mobile platform, and a wireless access point located remotely from said mobile platform, the system comprising:
      a first antenna disposed within an interior area of said mobile platform, said first antenna being used exclusively for communicating with said user operated wireless device;
      a conductor electrically coupled to the first antenna for conducting signals to and from the first antenna;
      a second antenna disposed on an exterior surface of said mobile platform, said second antenna being used exclusively for establishing a wireless communications link between said second antenna and said remotely located wireless access point;
      a second conductor electrically coupled to the second antenna for conducting signals to and from the second conductor; and
      a switch coupled between said first conductor and said second conductor for selectively enabling and disabling communication between said first antenna and said second antenna, communication being enabled between said first and second antennas when said switch is closed, and communication being interrupted when said switch is opened;
   an on-board network operated independently of the user operated wireless device, and independently of the first and second antennas, and also being inaccessible by the user operated wireless device;
   a third antenna for use exclusively with the on-board network, and used exclusively for enabling wireless communications concerning a performance of a plurality of sensors of the mobile platform between the on-board network and at least one transponded satellite, independently of wireless communications between the second antenna and the remotely located wireless access point; and
   wherein the switch is further controlled in relation to a sensed operating condition of the mobile platform to selectively enable and disable communication between the first antenna and the second antenna, exclusive of a wireless communications link established using the third antenna such that two independent and exclusive wireless communications paths are formed to the mobile platform.

10. The mobile platform of claim 9, further comprising an amplifier operably associated with at least one of said antennas for amplifying signals received by said one antenna.

11. The mobile platform of claim 9, further comprising an amplifier operably associated with at least one of said antennas for amplifying signals transmitted by said at least one of said antennas.

12. The mobile platform of claim 9, further comprising a filter for filtering signals received by at least one of said antennas to prevent signals within a predetermined frequency band from entering said interior area of said mobile platform via said second antenna.

13. The mobile platform of claim 9, further comprising a plurality of first antennas spaced apart within said interior area of said mobile platform, and each said first antenna being coupled for communication with said first conductor and said switch.

14. The mobile platform of claim 9, wherein said switch comprises a double pole, double throw (DPDT) switch.

15. The mobile platform of claim 9, wherein said switch comprises a radio frequency (RF) controlled switch.

16. The mobile platform of claim 9, further comprising a low noise amplifier for boosting an amplitude of signals received by said second antenna.

17. The mobile platform of claim 9, wherein said second antenna is housed within a blade-like housing secured to an exterior skin panel of said mobile platform.

18. The mobile platform of claim 9, wherein the sensed operating condition of the mobile platform comprises a sensed weight on a plurality of wheels of the mobile platform, and wherein the switch is controlled in accordance the sensed weight on the plurality of wheels of the mobile platform.

19. The mobile platform of claim 9, wherein the sensed operating condition of the mobile platform comprises a signal provided by an altimeter, and wherein the switch is controlled in accordance with the signal from the altimeter.

20. The mobile platform of claim 9, wherein the sensed operating condition of the mobile platform comprises a signal from an airspeed indicator, and wherein the switch is controlled in accordance with the signal from the air speed indicator of.

21. The mobile platform of claim 9, wherein the sensed operating condition of the mobile platform comprises a signal supplied by a crew member to manually control the switch.

22. A method for enabling radio frequency communications between a terrestrial based wireless access point and a mobile platform, the method comprising:
  shielding a body portion of a mobile platform;
  using a first antenna located within an interior area of the mobile platform exclusively to communicate wirelessly with at least one wireless device being used by a passenger located within the mobile platform;
  using a second antenna located on an exterior surface of said mobile platform exclusively to communicate, wirelessly, signals between with the wireless access point located remotely from said mobile platform and the second antenna; and
  selectively enabling and disabling communication between said first and second antennas to enable and disable wireless signals from at least one of entering and leaving said interior area of said mobile platform;
  controlling the enabling and disabling of the communication between said first and second antennas in accordance with a state of a mobile platform subsystem;
  locating an on-board network on the mobile platform, the on-board network being operated independently of the at least one user operated wireless device, independently of the first antenna and independently of the second antenna, and further being inaccessible by the user operated wireless device;
  using a third antenna in communication with the on-board network for establishing a wireless communications between the on-board network and at least one transponded satellite via the third antenna, the wireless communications link between the third antenna and the on-board network being operated exclusive of the communications link between the second antenna and the remote remotely located wireless access point;
  using a filter to isolate the on-board network from terrestrial based wireless signals while the mobile platform is at a terrestrial location; and
  using at least one of a weight on wheels sensor, an altimeter, and an air speed sensor to control operation of the switch.

23. The method of claim 22, wherein said selectively enabling and disabling communication between said first and second antennas comprises using a switch to connect or disconnect the transmission of signals between said first and second antennas.

* * * * *